(12) United States Patent
Vilermo et al.

(10) Patent No.: US 12,340,042 B2
(45) Date of Patent: Jun. 24, 2025

(54) TACTILE AUDIO DISPLAY

(71) Applicant: Nokia Technologies Oy, Espoo (FI)

(72) Inventors: Miikka Tapani Vilermo, Siuro (FI); Lasse Juhani Laaksonen, Tampere (FI); Arto Juhani Lehtiniemi, Lempäälä (FI)

(73) Assignee: Nokia Technologies Oy, Espoo (FI)

( * ) Notice: Subject to any disclaimer, the term of this patent is extended or adjusted under 35 U.S.C. 154(b) by 132 days.

(21) Appl. No.: 18/062,899

(22) Filed: Dec. 7, 2022

(65) Prior Publication Data

US 2023/0185396 A1     Jun. 15, 2023

(30) Foreign Application Priority Data

Dec. 15, 2021   (EP) .................................... 21214812

(51) Int. Cl.
  *G06F 3/041*   (2006.01)
  *G06F 3/01*    (2006.01)
  *G06F 3/16*    (2006.01)
  *H04R 1/20*    (2006.01)

(52) U.S. Cl.
  CPC .......... *G06F 3/04144* (2019.05); *G06F 3/016* (2013.01); *G06F 3/167* (2013.01); *H04R 1/20* (2013.01); *H04R 2400/03* (2013.01)

(58) Field of Classification Search
  CPC .......... G06F 3/016; G06F 3/165; G06F 3/167; H01H 13/85; H04R 1/20; H04R 2400/03
  See application file for complete search history.

(56) References Cited

U.S. PATENT DOCUMENTS

| | | | |
|---|---|---|---|
| 10,521,015 B2 * | 12/2019 | Yliaho | .................. H01H 13/85 |
| 2009/0176534 A1 | 7/2009 | Lee et al. | |
| 2010/0141408 A1 | 6/2010 | Doy et al. | |
| 2013/0182878 A1 | 7/2013 | Liu et al. | |

(Continued)

FOREIGN PATENT DOCUMENTS

| | | | |
|---|---|---|---|
| EP | 2821844 A1 | 1/2015 | |
| EP | 3147757 A1 | 3/2017 | |

(Continued)

OTHER PUBLICATIONS

Lim et al., "An audio-haptic feedbacks for enhancing user experience in mobile devices", IEEE International Conference on Consumer Electronics (ICCE), Jan. 11-14, 2013, pp. 49-50.

(Continued)

*Primary Examiner* — Priyank J Shah
(74) *Attorney, Agent, or Firm* — McCarter & English, LLP

(57) ABSTRACT

An apparatus comprising means configured to:
  determine if there is a touch at a tactile audio display comprising actuators configured to produce tactile feedback via touch at the tactile audio display in dependence on an input tactile feedback signal and to produce an acoustic audio signal from the tactile audio display in dependence on an input audio signal; and
  if there is a determined touch, perform a first differential signal processing on the input tactile feedback signal and the input audio signal, before provision to the actuators of the tactile audio display, to cause a relative attenuation between a lower frequency range and a higher frequency range for the input audio signal compared to the tactile feedback signal.

16 Claims, 5 Drawing Sheets

(56) References Cited

U.S. PATENT DOCUMENTS

| | | | |
|---|---|---|---|
| 2019/0094973 A1* | 3/2019 | Miller | G06F 3/041 |
| 2020/0057502 A1 | 2/2020 | Harvey et al. | |
| 2020/0068311 A1 | 2/2020 | Kang et al. | |
| 2020/0241678 A1 | 7/2020 | Yeom et al. | |
| 2021/0232308 A1 | 7/2021 | Cruz Hernandez et al. | |
| 2022/0312109 A1* | 9/2022 | Misawa | H04R 1/2811 |
| 2023/0126612 A1* | 4/2023 | Gajiwala | G06F 3/0202 |
| | | | 340/407.2 |

FOREIGN PATENT DOCUMENTS

| | | |
|---|---|---|
| WO | 2012/090031 A1 | 7/2012 |
| WO | 2013/136133 A1 | 9/2013 |

OTHER PUBLICATIONS

Extended European Search Report received for corresponding European Patent Application No. 21214812.6, dated May 20, 2022, 7 pages.

* cited by examiner

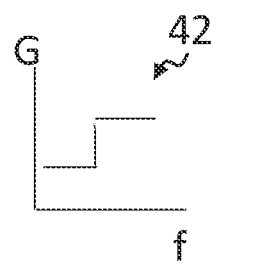
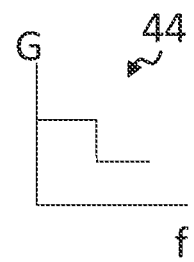
FIG. 6A  FIG. 6B
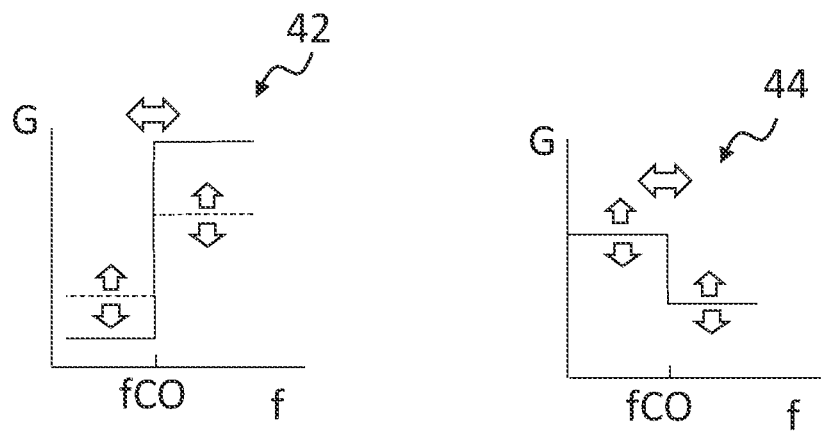
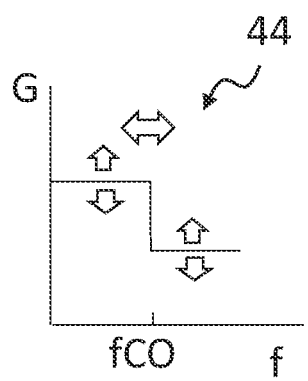
FIG. 7A  FIG. 7B

TACTILE AUDIO DISPLAY

TECHNOLOGICAL FIELD

Embodiments of the present disclosure relate to tactile audio display. In particular, in some examples, embodiments of the present disclosure relate to improved signal processing for tactile audio displays.

BACKGROUND

A tactile audio display comprises actuators configured to produce tactile feedback to a user via user touch at the tactile audio display in dependence on an input tactile feedback signal and to produce an acoustic audio signal from the tactile audio display in dependence on an input audio signal.

It is desirable to improve the operation of tactile audio displays.

BRIEF SUMMARY

According to various, but not necessarily all, embodiments there is provided an apparatus comprising means configured to:
determine if there is a touch at a tactile audio display comprising actuators configured to produce tactile feedback via touch at the tactile audio display in dependence on an input tactile feedback signal and to produce an acoustic audio signal from the tactile audio display in dependence on an input audio signal; and
if there is a determined touch, perform a first differential signal processing on the input tactile feedback signal and the input audio signal, before provision to the actuators of the tactile audio display, to cause a relative attenuation between a lower frequency range and a higher frequency range for the input audio signal compared to the tactile feedback signal.

In some but not necessarily all examples the apparatus comprises means configured to determine at least a location on the tactile audio display that has been touched.

In some but not necessarily all examples the apparatus is configured to cause a relative attenuation between a lower frequency range and a higher frequency range for the input audio signal compared to the tactile feedback signal In some but not necessarily all examples the apparatus is configured to apply attenuation at lower-frequencies to the input audio signal for a first set of one or more actuators adjacent the determined location and configured to apply amplification at lower-frequencies to the input audio signal for a second set of one or more actuators not adjacent the determined location.

In some but not necessarily all examples, the amplification at lower-frequencies to the input audio signal for the second set of one or more actuators not adjacent the determined location is controlled to compensate for the attenuation at lower-frequencies to the input audio signal for the first set of one or more actuators adjacent the determined location.

In some but not necessarily all examples the apparatus is configured to use a first set of one or more actuators adjacent the determined location for tactile feedback, not for producing an acoustic audio signal.

In some but not necessarily all examples the apparatus is configured to use actuators other than the first set of one or more actuators adjacent the touch location for audio. In some but not necessarily all examples the apparatus is configured to adaptively select, based on the determined location, one or more actuators for tactile feedback and one or more actuators for audio output, wherein as the determined location changes, the one or more actuators selected for tactile feedback changes.

In some but not necessarily all examples, the actuator selected for tactile feedback is a first actuator when the determined location is closer the first actuator compared to a second actuator and wherein the actuator selected for tactile feedback changes from a first actuator to the second actuator only when the determined location passes a transition point that is closer to the second actuator than the first actuator by more than a threshold value.

In some but not necessarily all examples the apparatus is configured to time shift the input tactile feedback signal provided to the second actuator relative to that provided to the first actuator in dependence upon the threshold value.

In some but not necessarily all examples the first differential signal processing is adapted in dependence on a pressure and/or location of a touch on the tactile audio display, wherein processing of the input audio signal is adapted in dependence on the pressure and/or the location of the touch on the tactile audio display.

In some but not necessarily all examples, processing of the input audio signal comprises:
a level of the input audio signal is increased with increasing pressure;
a level of the input audio signal is increased with decreasing distance between the location of the touch and an actuator that receives the input audio signal;
a relative attenuation of lower frequencies compared to higher frequencies for the input audio signal increases with increasing pressure
a relative attenuation of lower frequencies compared to higher frequencies for the input audio signal increases with decreasing distance between the location of the touch and an actuator that receives the input audio signal.

In some but not necessarily all examples the first differential signal processing on the input tactile feedback signal and the input audio signal, before provision to the actuators of the tactile audio display,
to cause a relative attenuation of higher frequencies compared to lower frequencies for the tactile feedback signal.

In some but not necessarily all examples the higher frequency range and the lower frequency range are separated by a cut-off frequency that changes in dependence upon a pressure and/or a location of a touch on the tactile audio display.

In some but not necessarily all examples the first differential signal processing comprises using a high-pass filter to filter the input audio signal or a low-pass filter to filter the tactile feedback signal.

In some but not necessarily all examples the first differential signal processing is based on importance detection, and avoid attenuation of important parts of important signals.

According to various, but not necessarily all, embodiments there is provided a method comprising:
determining if there is a touch at a tactile audio display comprising actuators configured to produce tactile feedback via touch at the tactile audio display in dependence on an input tactile feedback signal and to produce an acoustic audio signal from the tactile audio display in dependence on an input audio signal; and
if there is a determined touch, performing a first differential signal processing on the input tactile feedback signal and the input audio signal, before provision to the actuators of the tactile audio display, to cause a relative attenuation between a lower frequency range and a higher frequency range for the input audio signal compared to the tactile feedback signal.

According to various, but not necessarily all, embodiments there is provided a computer program that when run on one or more processors causes:

determining if there is a touch at a tactile audio display comprising actuators configured to produce tactile feedback via touch at the tactile audio display in dependence on an input tactile feedback signal and to produce an acoustic audio signal from the tactile audio display in dependence on an input audio signal; and if there is a determined touch, performing a first differential signal processing on the input tactile feedback signal and the input audio signal, before provision to the actuators of the tactile audio display, to cause a relative attenuation between a lower frequency range and a higher frequency range for the input audio signal compared to the tactile feedback signal According to various, but not necessarily all, embodiments there is provided an apparatus comprising means configured to:

determine if there is a touch at a tactile audio display comprising actuators configured to produce tactile feedback via touch at the tactile audio display in dependence on an input tactile feedback signal and to produce an acoustic audio signal from the tactile audio display in dependence on an input audio signal; and if there is a determined touch, perform different signal processing on the input tactile feedback signal and the input audio signal, for different actuators in dependence upon where the tactile audio display is touched.

According to various, but not necessarily all, embodiments there is provided an apparatus comprising means configured to:

determine if there is a touch at a tactile audio display comprising actuators configured to produce tactile feedback via touch at the tactile audio display in dependence on an input tactile feedback signal and to produce an acoustic audio signal from the tactile audio display in dependence on an input audio signal; and if there is a determined touch, perform signal processing on the input audio signal, in dependence upon where and/or how hard the tactile audio display is touched.

According to various, but not necessarily all, embodiments there is provided examples as claimed in the appended claims.

BRIEF DESCRIPTION

Some examples will now be described with reference to the accompanying drawings in which:

FIGS. 6A and 6B show an example of a spectra for an input tactile feedback signal and an input audio signal used to control actuators of the tactile audio display;

FIGS. 7A and 7B show an example of variation of spectra for an input tactile feedback signal and an input audio signal used to control actuators of the tactile audio display;

DETAILED DESCRIPTION

Figure 1:
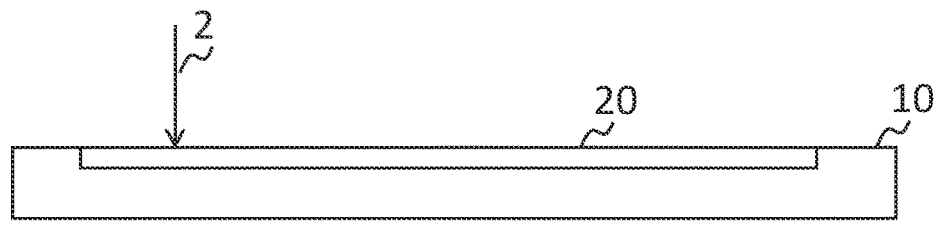
FIG. 1 shows an example of apparatus comprising a tactile audio display.

FIG. 1 illustrates an example of an apparatus 10 comprising a tactile audio display 20. The tactile audio display 20 comprises actuators 50 configured to produce tactile feedback to a user via a user touch 2 at the tactile audio display 20.

The apparatus 10 can be any suitable apparatus. It can be a desktop, wall-mounted, mobile or hand-portable apparatus, for example. The apparatus 10 can enable any suitable functionality. The tactile audio display 20 is used by the apparatus 10 to provide visual output and tactile (haptic) output to the user.

In some but not necessarily all examples, the tactile audio display 20 is a touch input device and is used to provide user input commands to the apparatus 10. In some but not necessarily all examples, the tactile audio display 20 is a touch-sensitive tactile audio display.

Figure 2:
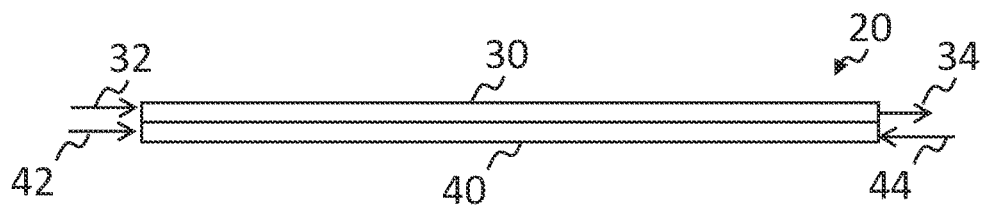
FIG. 2 shows an example of a tactile audio display.

FIG. 2 illustrates an example of a tactile audio display 20. The tactile audio display 20 comprises a display portion 30 for providing visual output to the user and an actuation portion 40 for providing tactile (haptic) output to the user and audio output to the user.

In this example, the display portion 30 is an upper layer and the actuation portion 40 is a lower layer of a multi-layer tactile audio display 20.

The visual output provided to the user by the display portion 30 is controlled by an input display signal 32 at the display portion 30.

The audio output provided to the user by the actuation portion 40 is controlled by an input audio signal 42 at the actuation portion 40.

The tactile (haptic) output provided to the user by the actuation portion 40 is controlled by tactile feedback signal 44 at the actuation portion 40.

In this example, the tactile audio display 20 is a touch-sensitive tactile audio display 20. The display portion 30 is a touch-sensitive display portion that detects a touch of a user and responds by producing touch detection signals 34.

A touch detection signal 34 can indicate the occurrence of a touch, or a location of a touch, or a pressure value for a touch (firmness of touch) or a location of a touch and a pressure value for the touch.

In some examples, the touch-sensitive tactile audio display 20 is used to provide user input commands to the apparatus 10. User commands to the apparatus made via touch at the touch-sensitive display portion 30 are output by the touch-sensitive display portion 30 as touch detection signals 34.

Figure 3:
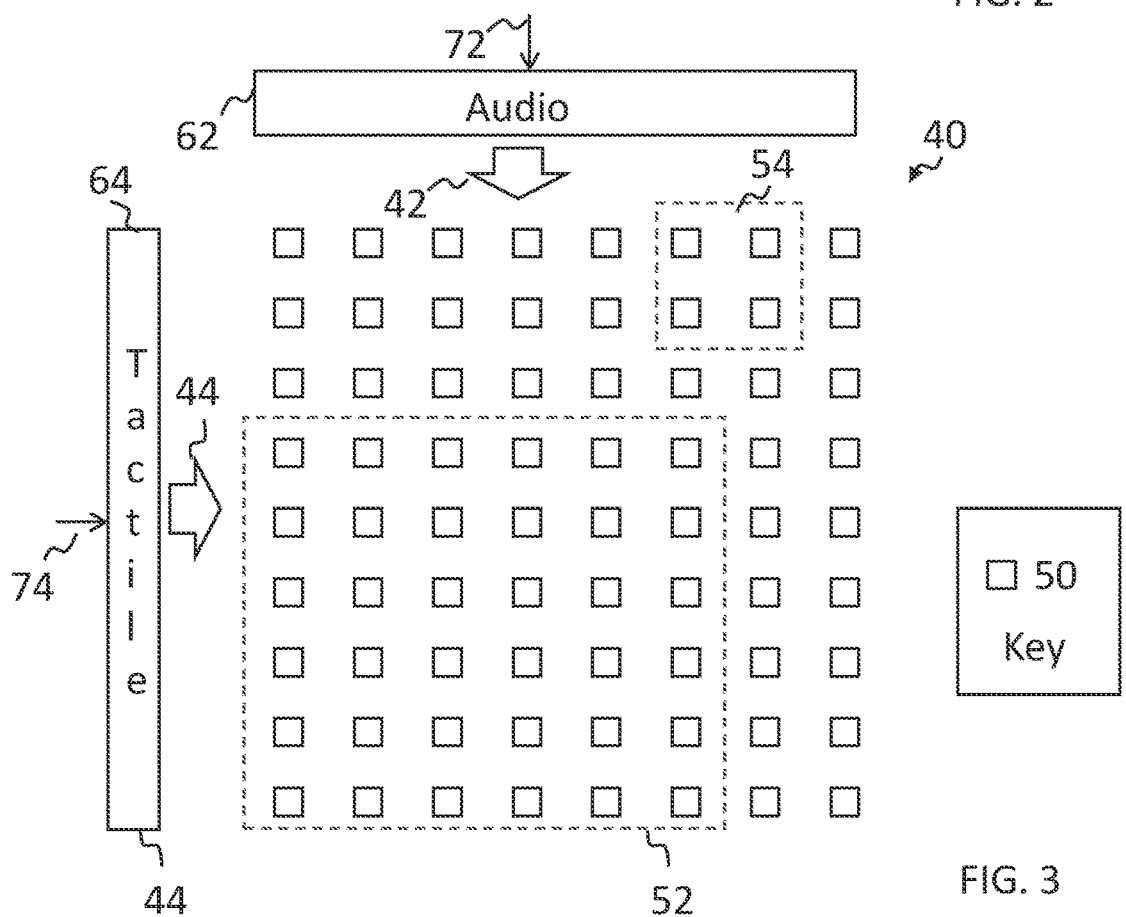
FIG. 3 shows an example of control circuitry for a tactile audio display comprising actuators.

FIG. 3 illustrates an example of the touch-sensitive tactile audio display 20 illustrated in FIG. 2, and in particular the actuator 50 of the actuation portion 40. In the example illustrated in FIG. 2, there can be one or more actuators 50. In the example illustrated in FIG. 3, there are more than one actuator 50 in the actuation portion 40.

In this example, but not necessarily all examples an actuator 50 can be used to produce tactile feedback in dependence upon the tactile feedback signal 44 at the actuation portion 40 or audio output in dependence upon the input audio signal 42 at the actuation portion 40.

In this example the actuators 50 are arranged in an array.

The actuators 50 can be any suitable actuators. They can, for example, be piezoelectric actuators or electromechanical actuators.

Audio processing circuitry 62 is configured to receive a received input audio signal 72 and produce the input audio signal 42 that is provided to actuators 50 of the actuation portion 40. In at least some examples, the audio processing circuitry 62 is configured to control characteristics of the input audio signal 42 to control audio output to the user.

Tactile processing circuitry 64 is configured to receive a received tactile feedback signal 74 and produce the tactile feedback signal 44 that is provided to actuators 50 of the actuation portion 40. In at least some examples, the tactile processing circuitry 64 is configured to control characteristics of the tactile feedback signal 44 to control tactile output to the user.

In some but not necessarily all examples, the audio processing circuitry 62 is configured to selectively provide the input audio signal 42 to a sub-set 52 of the actuators 50. In some but not necessarily all examples, the sub-set 52 of the actuators 50 used for audio output can be varied to change an area covered by the sub-set 52. This can be achieved by changing a location of the sub-set 52 and/or changing the number of actuators 50 included in the sub-set 52.

In some but not necessarily all examples, the tactile processing circuitry 64 is configured to selectively provide the tactile feedback signal 44 to a sub-set 54 of the actuators 50. In some but not necessarily all examples, the sub-set 54 of the actuators 50 used for audio output can be varied to change an area covered by the sub-set 54. This can be achieved by changing a location of the sub-set 54 and/or changing the number of actuators 50 included in the sub-set 54.

In some but not necessarily all examples, the sub-set 52 of the actuators 50 used for audio output can be any sub-set of the actuators 50. In some but not necessarily all examples, the sub-set 54 of the actuators 50 used for tactile feedback can be any sub-set of the actuators 50.

In some but not necessarily all examples, the sub-set 52 of the actuators 50 receive only the input audio signal 42 and are used only for audio output and not for tactile output. In some but not necessarily all examples, the sub-set 54 of the actuators 50 receive only the tactile feedback signal 44 and are used only for tactile output and not for audio output. In other examples, an actuator 50 can receive both the input audio signal 42 and the tactile feedback signal 44 and produce both tactile output and audio output.

Figure 4:
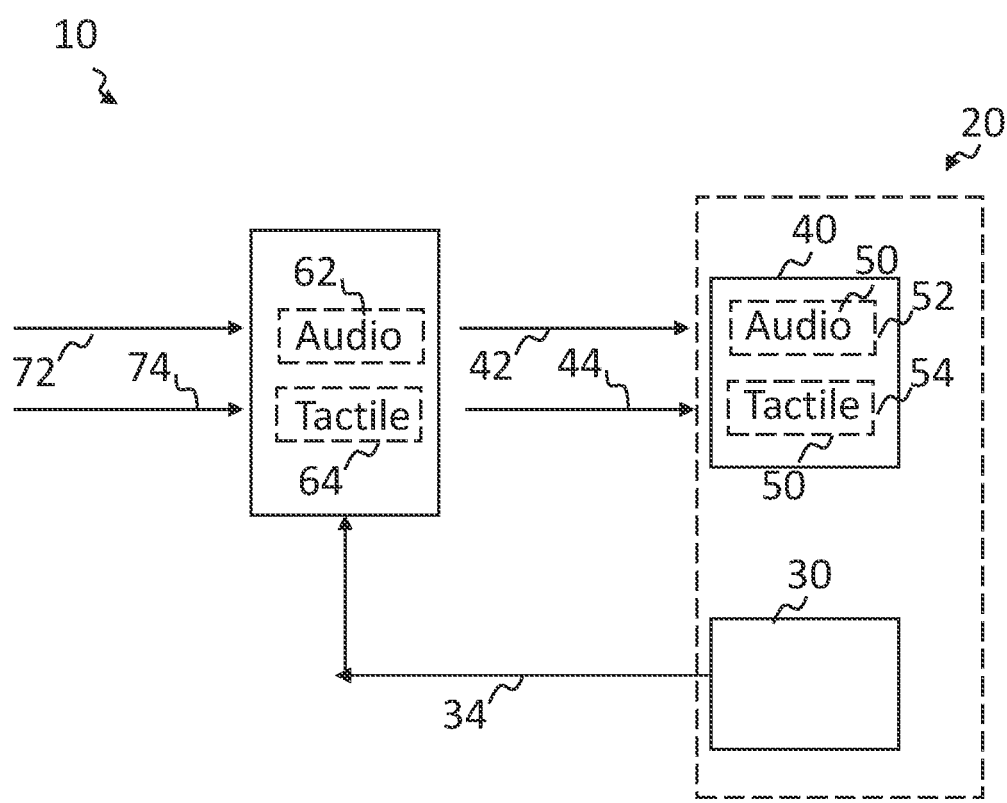
FIG. 4 shows an example of a tactile audio display as functional blocks.

FIG. 4 illustrates an example of the apparatus 10 as previously described. The apparatus 10 is configured to determine if there is a touch 2 at the tactile audio display 20 comprising actuators 50 configured to produce tactile feedback via touch 2 at the tactile audio display 20 in dependence on a tactile feedback signal 44 and to produce an acoustic audio signal from the tactile audio display 20 in dependence on an input audio signal 42.

The apparatus 10 is configured to perform a first differential signal processing on the tactile feedback signal 44 and the input audio signal 42, before provision to the actuators 50 of the tactile audio display 20.

The first differential signal processing causes, when performed, a relative attenuation between a lower frequency range and a higher frequency range for the input audio signal 42 compared to the tactile feedback signal 44.

The performance of the first differential signal processing is conditional and occurs if there is a determined touch 2.

If there is not a determined touch 2, the first differential signal processing is not performed.

It is desirable to isolate tactile feedback that is dependent on the tactile feedback signal 44 from the output acoustic audio signal that is dependent on the input audio signal 42. The first differential signal processing can be used to improve this isolation. This improved isolation can be achieved in the frequency domain by attenuating lower frequency components of the input audio signal 42 which could produce a tactile output and/or attenuating higher frequency components of the tactile feedback signal 44 which could produce an audio output.

The display portion 30 is a touch-sensitive display portion that detects a touch of a user and responds by producing touch detection signals 34. A touch detection signal 34 can indicate the occurrence of a touch, or a location of a touch, or a pressure value for a touch (firmness of touch) or a location of a touch and a pressure value for the touch.

Audio processing circuitry 62 is configured to receive a received input audio signal 72 and produce the input audio signal 42 that is provided to actuators 50 of the actuation portion 40. The audio processing circuitry 62 is configured to control characteristics of the input audio signal 42 to control audio output to the user. In some but not necessarily all examples, the audio processing circuitry 62 is configured to selectively provide the input audio signal 42 to a controllably variable sub-set 52 of the actuators 50.

Tactile processing circuitry 64 is configured to receive a received tactile feedback signal 74 and produce the tactile feedback signal 44 that is provided to actuators 50 of the actuation portion 40. In at least some examples, the tactile processing circuitry 64 is configured to control characteristics of the tactile feedback signal 44 to control tactile output to the user. In some but not necessarily all examples, the tactile processing circuitry 64 is configured to selectively provide the tactile feedback signal 44 to a controllably variable sub-set 54 of the actuators 50.

Figure 5A:
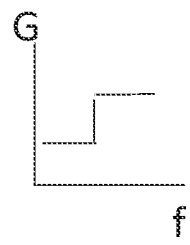
FIGS. 5A and 5B show an example of a spectra for an input tactile feedback signal and an input audio signal used to control actuators of the tactile audio display.
Figure 5B:
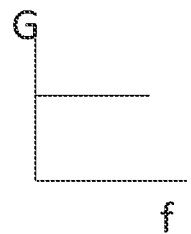

FIGS. 5A and 5B, and also FIGS. 6A and 6B, illustrate examples that illustrates relative attenuation between a lower frequency range and a higher frequency range for the input audio signal 42 compared to the tactile feedback signal 44. FIG. 5A represents a frequency spectrum of one of the input audio signal 42 and tactile feedback signal 44 and FIG. 5B represents a frequency spectrum for the other one of the input audio signal 42 and tactile feedback signal 44. FIG. 6A represents a frequency spectrum of the input audio signal 42 and FIG. 6B represents a frequency spectrum for the tactile feedback signal 44.

In these examples, FIGS. 5A and 5B (and also FIGS. 6A & 6B) illustrate relative attenuation of a lower frequency range compared to a higher frequency range for the input audio signal 42, compared to the tactile feedback signal 44. In FIGS. 5A & 5B, the input audio signal 42 has been relatively attenuated at lower frequencies compared to higher frequencies of the input audio signal 42 and lower and higher frequencies of the tactile feedback signal 44. In FIGS. 6A & 6B, the input audio signal 42 has been relatively attenuated at lower frequencies compared to higher frequencies of the input audio signal 42 and lower frequencies of the tactile feedback signal 44. Also, the tactile feedback signal 44 has been relatively attenuated at higher frequencies compared to lower frequencies of the tactile feedback signal 44 and higher frequencies of the input audio signal 42.

In some but not all examples, the first differential signal processing can comprise using a high-pass filter to filter the input audio signal 42 (FIG. 5A, 6A) and/or a low-pass filter to filter the tactile feedback signal 44 (FIG. 6B).

The first differential signal processing can also comprise additional processing such as, for example, filtering, equalization, compression etc.

In some but not necessarily all examples, the first differential signal processing is based on importance detection, and avoids attenuation of important parts of important signals. For example, a time period of the input audio signal 42 can be considered 'important' because it represents speech. In this situation a frequency range that is used for voice is not attenuated. The speech portion of the input audio signal 42 can be recognized using speech recognition algorithms and/or using metadata. A portion of the input audio signal 42 can otherwise be recognized as important using metadata.

In some but not necessarily all examples, the first differential signal processing is adapted in dependence on a pressure and/or a location of a touch 2 on the tactile audio display 20.

For example, as illustrated in FIG. 7A, processing of the input audio signal 42 is adapted in dependence on the pressure and/or the location of the touch 2 on the tactile audio display 20.

For example, as illustrated in FIG. 7B, processing of the tactile feedback signal 44 is adapted in dependence on the pressure and/or the location of the touch 2 on the tactile audio display 20.

The first differential signal processing on the tactile feedback signal 44 and the input audio signal 42, before provision to the actuators 50 of the tactile audio display 20, can cause a relative attenuation in a first higher frequency range compared to a first lower frequency range for the tactile feedback signal 44 and/or cause a relative attenuation in the second lower frequency range compared to a second higher frequency range for the input audio signal 42.

In some but not necessarily all examples, the first higher frequency range and the first lower frequency range are separated by a first cut-off frequency that changes in dependence upon a pressure and/or a location of a touch 2 on the tactile audio display 20 and/or the second higher frequency range and the second lower frequency range are separated by a second cut-off frequency that changes in dependence upon a pressure and/or a location of a touch 2 on the tactile audio display 20.

In some examples, the first higher frequency range, used for attenuating the tactile feedback signal 44 has a lower first cutoff frequency when used for actuator(s) 50 closest to those actuator(s) 50 used for audio output and has a higher first cutoff frequency (or no cutoff frequency) when used for actuator(s) 50 most distant from those actuator(s) 50 used for audio output. The first cutoff frequency can therefore vary in dependence upon a distance of a touch 2 from the actuator 50 used for audio output. The first cutoff frequency can reduce with reducing distance between a touch 2 and the closest actuator 50 used for audio output.

In some examples, the second lower frequency range, used for attenuating the input audio signal 42 has a higher second cutoff frequency when used for actuator(s) 50 closest to those actuator(s) 50 used for tactile feedback and has a lower second cutoff frequency (or no cutoff frequency) when used for actuator(s) 50 most distant from those actuator(s) 50 used for tactile feedback. The second cutoff frequency can therefore vary in dependence upon a distance of a touch 2 from the actuator 50 used for audio output. The second cutoff frequency can increase with reducing distance between a touch 2 and the closest actuator 50 used for audio output.

The assessment of distance between actuators 50 can be dependent upon a pressure of a touch 2.

In some but not necessarily all examples, the first higher frequency range and the first lower frequency range are the same as the second higher frequency range and the second lower frequency range and the first cut-off frequency is the same as the second cut-off frequency. The common cut-off frequency can change in dependence upon a pressure and/or a location of a touch 2 on the tactile audio display 20.

The first differential signal processing can be used to improve isolation in the frequency domain by attenuating, in the lower frequency range, the input audio signal 42 which could produce a tactile output and/or attenuating, in the higher frequency range, the tactile feedback signal 44 which could produce an audio output.

In some examples, an overall level of input audio signal 42 at an actuator 50 is increased the more touch pressure is applied and/or the closer the touch is to the actuator 50.

In some examples, a level of the input audio signal 42 is increased (FIG. 7A) with increasing pressure. In some examples, a level of the input audio signal 42 is increased (FIG. 7A) with decreasing distance between the location of the touch 2 and an actuator 50 that receives the input audio signal 42.

In some examples, a relative attenuation of lower frequencies compared to higher frequencies for the input audio signal 42 increases (FIG. 7A) with increasing pressure. In some examples, a relative attenuation of lower frequencies compared to higher frequencies for the input audio signal 42 increases (FIG. 7A) with decreasing distance between the location of the touch 2 and an actuator 50 that receives the input audio signal 42.

In some examples, an overall level of input audio signal 42 at an actuator 50 is increased, in the higher frequency range (FIG. 7A), the more touch pressure is applied and/or the closer the touch is to the actuator 50.

In some examples, an overall level of input audio signal 42 at an actuator 50 is decreased, in the lower frequency range (FIG. 7A), the more touch pressure is applied and/or the closer the touch is to the actuator 50.

In at least some examples, the tactile audio display 20 has an improved frequency-response. The input audio signal 42 is compensated to compensate for changes produced by one or more touches. This input audio signal 42 is compensated for changes in frequency response of the tactile audio display 20 based on location(s) and/or pressure(s) of one or more touches 2.

Isolation of tactile feedback (which is dependent on the tactile feedback signal 44) from the output acoustic audio signal (which is dependent on the input audio signal 42), can be achieved not only in the frequency domain but also in the spatial domain. In some examples it is desirable to spatially isolate the sub-set 54 of actuator(s) 50 that provide tactile feedback in dependence on the tactile feedback signal 44 from the sub-set 52 of actuator(s) 50 that provide an output acoustic audio signal in dependence on the input audio signal 42. This can be particularly useful in larger apparatus 10.

In at least some examples, the apparatus 10 is configured to cause a relative attenuation between the lower frequency range and the higher frequency range for the input audio signal 42 compared to the tactile feedback signal 44 selectively for a first set of one or more actuators 50 adjacent the determined location of the touch 2. In some examples, relative attenuation between the lower frequency range and the higher frequency range for the input audio signal 42 compared to the tactile feedback signal 44 is exclusively applied to the first set of one or more actuators 50 adjacent the determined location of the touch 2 and is not applied to other actuators 50.

In some examples, the apparatus 10 is configured to apply attenuation at lower-frequencies (e.g., the lower frequency range) to the input audio signal 42 for the first set of one or more actuators 50 adjacent the determined touch location and configured to apply amplification at lower-frequencies (e.g., the lower frequency range) to the input audio signal 42 for a second set of one or more actuators 50 not adjacent the determined location. This is illustrated in FIG. 7A.

The first set of one or more actuators 50 are proximal to the determined touch location and the second set of one or more actuators 50 are distal from the determined location.

The amplification at lower-frequencies to the input audio signal 42 for the second set of one or more actuators 50 not adjacent the determined location is controlled to compensate for the attenuation at lower-frequencies to the input audio signal 42 for the first set of one or more actuators 50 adjacent the determined location.

In at least some examples, the compensation results in the overall audio frequency response for all actuators 50 as a whole being the same, whether or not there is a determined touch 2.

The apparatus 10 thus modifies the tactile feedback signal 44 and/or the input audio signal 42 based on the determined touch location on the tactile audio display 20 so that the part of the tactile audio display 20 where the determined touch occurs is controlled to produce the feedback signal properly and other parts of the tactile audio display 20 are controlled to produce the audio output correctly.

In at least some examples, the apparatus 10 is configured to only use the actuator(s) 50 adjacent the determined touch location for tactile feedback and is configured to only use actuators 50 other than the actuator(s) 50 adjacent the touch location for audio output.

Thus, the apparatus 10 is configured to adaptively select, based on the determined touch location, actuator(s) 50 for tactile feedback and actuator(s) 50 for audio output. As the determined location changes, the actuator(s) 50 selected for tactile feedback change. In some examples, the actuator(s) 50 selected for audio output also change.

The transition between using different actuators 50 for the tactile feedback in response to a change in touch position (e.g., dragging a finger over the tactile audio display 20) can exhibit hysteresis. Let a first actuator 50 be selected for tactile feedback and a second actuator 50 not be selected for tactile feedback when the determined touch location is closer the first actuator 50 than the second actuator 50. The actuator 50 selected for tactile feedback changes from the first actuator 50 to the second actuator 50 only when the determined touch location moves from being closer to the first actuator to being closer to the actuator second actuator but in addition continues moving past a transition point that is closer to the second actuator 50 than the first actuator 50 by more than a threshold value. The apparatus 10 can be configured to time-shift the tactile feedback signal 44 provided to the second actuator 50 relative to that provided to the first actuator 50 in dependence upon the threshold value.

Figure 8:
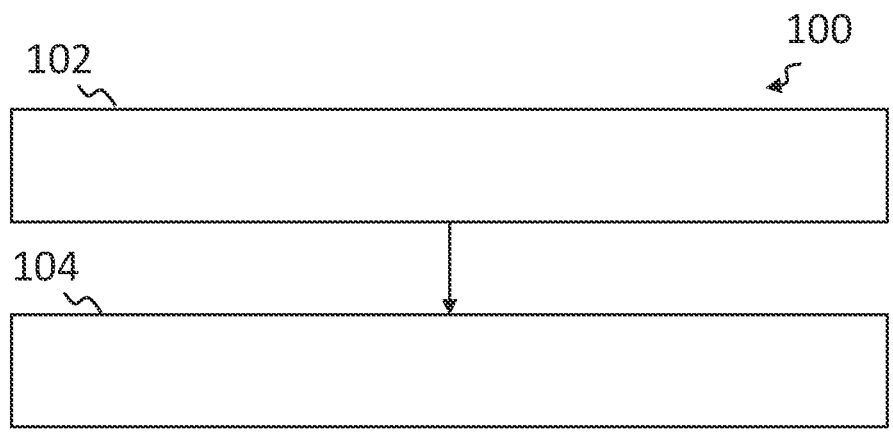
FIG. 8 shows an example of a method.

FIG. 8 illustrates an example of a method 100. The method is a method for differential signal processing of a tactile feedback signal 44 and an input audio signal 42, before provision to actuators 50 of a tactile audio display 20.

At block 102, the method 100 comprises determining if there is a touch 2 at a tactile audio display 20 comprising actuators 50 configured to produce tactile feedback via touch 2 at the tactile audio display 20 in dependence on a tactile feedback signal 44 and to produce an acoustic audio signal from the tactile audio display 20 in dependence on an input audio signal 42.

At block 104, the method 100 comprises, performing a first differential signal processing on the tactile feedback signal 44 and the input audio signal 42, before provision to the actuators 50 of the tactile audio display 20, if there is a determined touch 2. The performed first differential signal processing causes a relative attenuation between a lower frequency range and a higher frequency range for the input audio signal 42 compared to the tactile feedback signal 44.

The proceeding examples have described an apparatus 10 comprising means configured to:

determine if there is a touch 2 at a tactile audio display 20 comprising actuators 50 configured to produce tactile feedback via touch 2 at the tactile audio display 20 in dependence on a tactile feedback signal 44 and to produce an acoustic audio signal from the tactile audio display 20 in dependence on an input audio signal 42; and if there is a determined touch, perform a first differential signal processing on the tactile feedback signal 44 and the input audio signal 42, before provision to the actuators 50 of the tactile audio display 20, to cause a relative attenuation between a lower frequency range and a higher frequency range for the input audio signal 42 compared to the tactile feedback signal 44.

The proceeding examples have described an apparatus 10 comprising means configured to:

determine if there is a touch 2 at a tactile audio display 20 comprising actuators 50 configured to produce tactile feedback via touch 2 at the tactile audio display 20 in dependence on a tactile feedback signal 44 and to produce an acoustic audio signal from the tactile audio display 20 in dependence on an input audio signal 42; and if there is a determined touch 2, perform different signal processing on the tactile feedback signal 44 and the input audio signal 42, for different actuators 50 in dependence upon where the tactile audio display 20 is touched.

The proceeding examples have described an apparatus 10 comprising means configured to:

determine if there is a touch 2 at a tactile audio display 20 comprising actuators 50 configured to produce tactile feedback via touch 2 at the tactile audio display 20 in dependence on a tactile feedback signal 44 and to produce an acoustic audio signal from the tactile audio display 20 in dependence on an input audio signal 42; and if there is a determined touch 2, perform signal processing on the input audio signal 42, in dependence upon where and/or how hard the tactile audio display 20 is touched.

The audio processing circuitry 62 and the tactile processing circuitry 64 can be provided as separate circuits or as a one circuit.

The audio processing circuitry 62 and the tactile processing circuitry 64 can be provided as separate controllers or as one controller.

Figure 9:
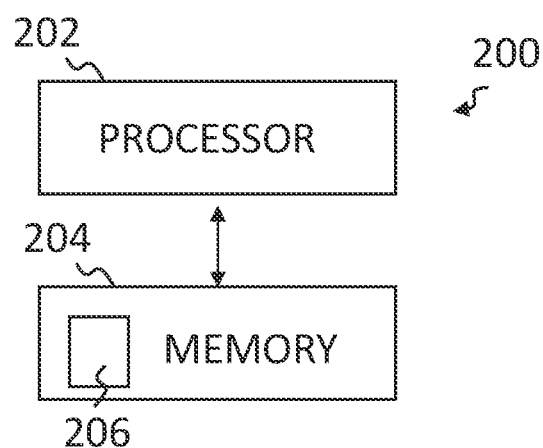
FIG. 9 shows an example of a controller.

FIG. 9 illustrates an example of a controller 200. Implementation of a controller 200 may be as controller circuitry. The controller 200 may be implemented in hardware alone, have certain aspects in software including firmware alone or can be a combination of hardware and software (including firmware).

As illustrated in FIG. 9 the controller 200 may be implemented using instructions that enable hardware functionality, for example, by using executable instructions of a computer program 206 in a general-purpose or special-purpose processor 202 that may be stored on a computer readable storage medium (disk, memory etc.) to be executed by such a processor 202.

The processor 202 is configured to read from and write to the memory 204. The processor 202 may also comprise an output interface via which data and/or commands are output by the processor 202 and an input interface via which data and/or commands are input to the processor 202.

The memory 204 stores a computer program 206 comprising computer program instructions (computer program code) that controls the operation of the apparatus 10 when loaded into the processor 202. The computer program instructions, of the computer program 206, provide the logic and routines that enables the apparatus to perform the methods illustrated in FIGS. 1 to 8. The processor 202 by reading the memory 204 is able to load and execute the computer program 206.

The apparatus 10 therefore comprises:
at least one processor 202; and
at least one memory 204 including computer program code
the at least one memory 204 and the computer program code configured to, with the at least one processor 202, cause the apparatus 10 at least to perform:
determining if there is a touch 2 at a tactile audio display 20 comprising actuators 50 configured to produce tactile feedback via touch 2 at the tactile audio display 20 in dependence on a tactile feedback signal 44 and to produce an acoustic audio signal from the tactile audio display 20 in dependence on an input audio signal 42; and
if there is a determined touch 2, performing a first differential signal processing on the tactile feedback signal 44 and the input audio signal 42, before provision to the actuators 50 of the tactile audio display 20, to cause a relative attenuation between a lower frequency range and a higher frequency range for the input audio signal 42 compared to the tactile feedback signal 44.

Figure 10:
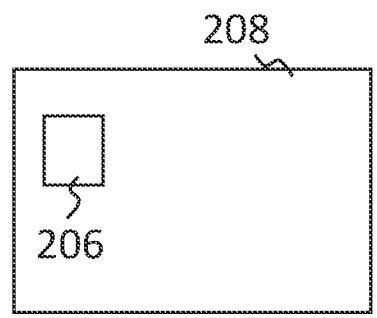
FIG. 10 shows an example of computer program.

As illustrated in FIG. 10, the computer program 206 may arrive at the apparatus 10 via any suitable delivery mechanism 208. The delivery mechanism 208 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid-state memory, an article of manufacture that comprises or tangibly embodies the computer program 206. The delivery mechanism may be a signal configured to reliably transfer the computer program 206. The apparatus 10 may propagate or transmit the computer program 206 as a computer data signal.

Computer program instructions for causing an apparatus to perform at least the following or for performing at least the following:
determining if there is a touch 2 at a tactile audio display 20 comprising actuators 50 configured to produce tactile feedback via touch 2 at the tactile audio display 20 in dependence on a tactile feedback signal 44 and to produce an acoustic audio signal from the tactile audio display 20 in dependence on an input audio signal 42; and
if there is a determined touch 2, performing a first differential signal processing on the tactile feedback signal 44 and the input audio signal 42, before provision to the actuators 50 of the tactile audio display 20, to cause a relative attenuation between a lower frequency range and a higher frequency range for the input audio signal 42 compared to the tactile feedback signal 44.

The computer program instructions may be comprised in a computer program, a non-transitory computer readable medium, a computer program product, a machine readable medium. In some but not necessarily all examples, the computer program instructions may be distributed over more than one computer program.

Although the memory 204 is illustrated as a single component/circuitry it may be implemented as one or more separate components/circuitry some or all of which may be integrated/removable and/or may provide permanent/semi-permanent/dynamic/cached storage.

Although the processor 202 is illustrated as a single component/circuitry it may be implemented as one or more separate components/circuitry some or all of which may be integrated/removable. The processor 202 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:
(a) hardware-only circuitry implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions and
(c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in the FIGS. 1 to 8 may represent steps in a method and/or sections of code in the computer program 206. The illustration of a particular order to the blocks does not necessarily imply that there is a required or preferred order for the blocks and the order and arrangement of the block may be varied. Furthermore, it may be possible for some blocks to be omitted.

Some specific embodiments of the apparatus 10 will be described with reference to FIGS. 11, 12, 13.

In these examples, audio processing circuitry 62 is configured to produce the input audio signal 42. This can, for example, be in response to a received input audio signal 72 (not illustrated). The tactile processing circuitry 64 is configured to produce the tactile feedback signal 44. This can, for example, be in response to a received tactile feedback signal 74 (not illustrated). In these examples, the input audio signal 42 and tactile feedback signal 44 are combined and converted by circuitry 80 to activation signals for actuators 50 of the tactile audio display 20

In this example, the audio processing circuitry 62 and the tactile processing circuitry 64 are provided as separate circuits or but in other examples they can be provided as one circuit.

Figure 11:
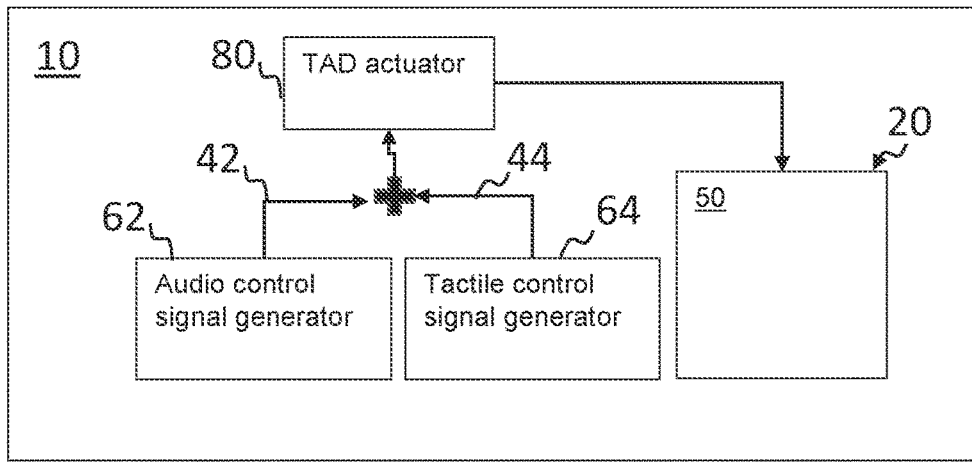
FIG. 11 shows an example of a tactile audio display.

Embodiment 1 (FIG. 11)

In this example, the input audio signal 42 has been modified based on finger(s) touch location and/or pressure on the tactile audio display 20. The tactile audio display 20 has at least one actuator 50.

Pressing a finger on tactile audio display 20 adds effective weight to the tactile audio display 20 (increases impedance of the tactile audio display 20) thus making it harder for the actuator 50 to move the display portion 30. Such an increase in the impedance changes the sound waves that the tactile audio display 20 causes.

The change in acoustic output signal (sound) can be characterized as a change in device frequency response. Typically, the harder the user presses the finger, the more the higher frequencies are attenuated compared to lower frequencies. Also, the overall loudness of the acoustic signal is reduced. The effect is typically greater the closer the finger touch 2 is to the actuator 50. The apparatus 10 knows the finger touch location and sometimes the pressure because the tactile audio display 20 can be a touch-sensitive display and sometimes even a pressure sensitive touch display.

The finger location (and pressure) is/are used to modify the input audio signal 42 so that overall level is increased the harder the finger pressure of the touch 2 and the closer the finger touch 2 is to the actuator 50 used for audio output. Also, higher frequencies can be increased more than lower frequencies.

Figure 12:
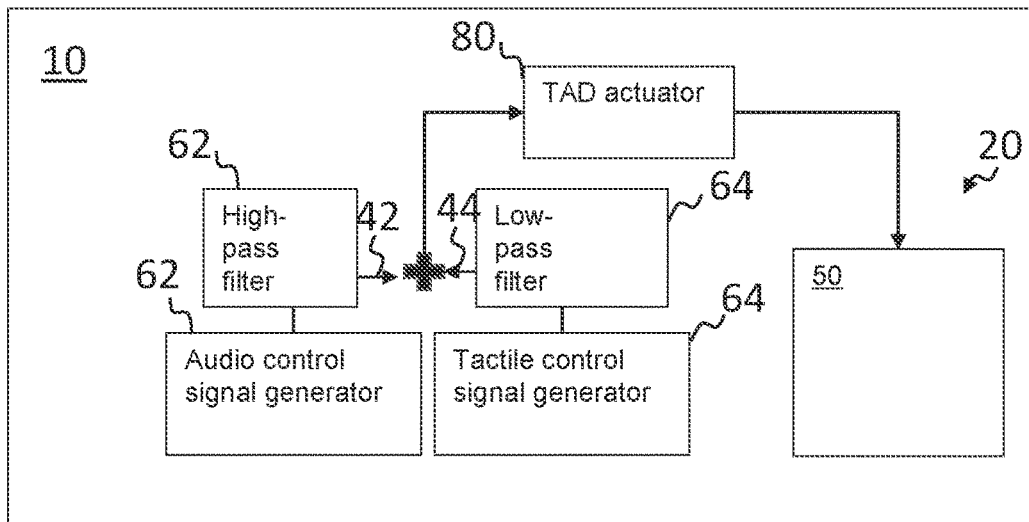
FIG. 12 shows an example of a tactile audio display.

Embodiment 2 (FIG. 12)

In this example, the tactile feedback signal 44 has been modified based on the input audio signal 42 and vice versa. The tactile audio display 20 has at least one actuator 50.

With smaller apparatus 10, the tactile (haptic) and audio output signals don't usually interfere with each other because the haptic signal is at such low frequencies that the display cannot produce a significant acoustic signal at those frequencies (<300 Hz or thereabouts). With larger apparatus 10 such as tablets and televisions, this is no longer the case and the haptic signal can cause an audible signal, which is not intended. Even in smaller devices the audio signal can cause a haptic response to the user finger if the audio signal contains very low frequencies.

In this example, the tactile feedback signal 44 and the input audio signal 42 are filtered signals, so that the audio signal doesn't contain low frequencies that could cause a significant tactile feedback (high-pass filtering), and the tactile feedback signal 44 doesn't contain such high frequencies that the tactile audio display 20 in question can turn into an audible amount of acoustic output. The modification to the input audio signal 42 is used only when tactile feedback is given and user finger touches 2 the tactile audio display 20.

In an implementation the high-pass filter cut off point and the low-pass filter cut-off point is the same and this is called cross-over frequency. The cross-over frequency may be adaptable so that it may adaptively changed to a higher frequency to make room for a better-quality tactile feedback signal 44 or it may move to a lower frequency to make room for a higher quality input audio signal 42. The cross-over frequency can depend on detected finger presence (touch 2) on the tactile audio display 20. A light touch 2 or detected hover touch 2 may result in the apparatus 10 keeping the cross-over frequency quite low in frequency but a more solid touch 2 causes the apparatus 10 to increase the cross-over frequency.

Figure 13:
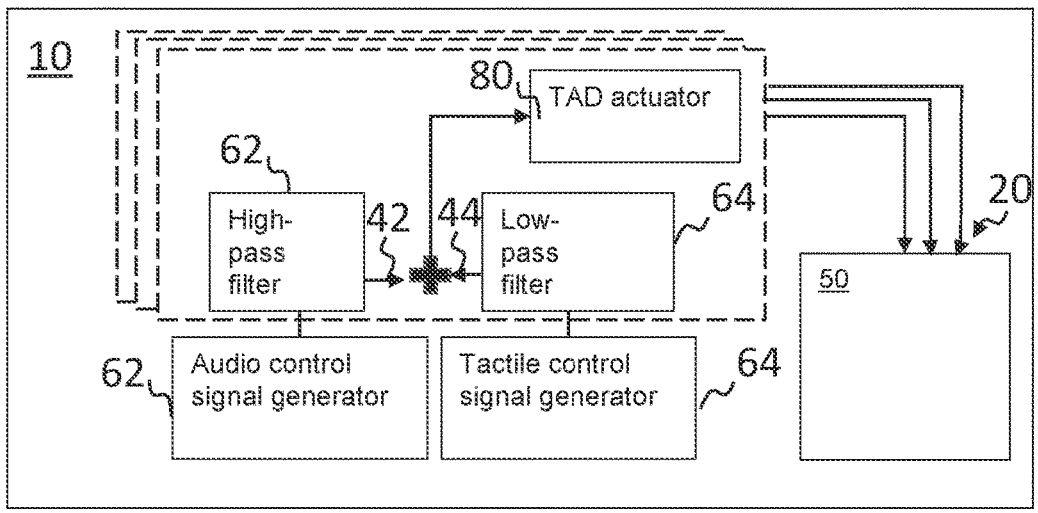
FIG. 13 shows an example of a tactile audio display.

Embodiment 3 (FIG. 13)

In this example, the tactile audio display 20 has at least two actuators 50 that can be separately controlled. In this example stereo audio, or spatial audio, can be rendered by using multiple input audio signals 42 for different actuators 50.

The apparatus 10 can play sounds differently from different parts of the tactile audio display 20. The apparatus 10 modifies the tactile feedback signal 44 and the input audio signal 42 based on finger(s) location on the display when a touch 2 occurs so that the part of the tactile audio display 20 where the finger is touching is used to produce the tactile output properly and other parts of the tactile audio display 20 are used to output the acoustic audio signal correctly.

In one example, one of the actuators 50 is used to create tactile feedback whereas multiple actuators 50 are used to create audio output. The tactile feedback is determined on finger location of the touch 2 on the tactile audio display 20 and thus doesn't need to be different in different parts of the tactile audio display 20 simultaneously whereas the input audio signal 42 needs to be different in different parts of the tactile audio display 20 for example for stereo or spatial audio playback. The one tactile actuator 50 may be one of the audio actuators 50 or not.

The apparatus 10 detects if the finger touch 2 is close to one of the actuators 50 and modifies its control signal using methods from Embodiments 1 and 2. The other actuator signals may be modified to compensate for the modification. For example, if the input audio signal 42 for the actuator 50 nearest to the finger is high-pass filtered then the lower frequencies that are attenuated in the high-pass filtering may be played louder from the actuators 50 that are farther away from the high-pass filtered actuator 50.

In this example, the tactile feedback signal 44 and the input audio signal 42 are filtered signals, so that the audio signal doesn't contain low frequencies that could cause significant tactile feedback (high-pass filtering), and the tactile feedback signal 44 doesn't contain such high frequencies that the tactile audio display 20 in question can turn into an audible amount of acoustic output (low-pass filtering). The modification to the input audio signal 42 can be used only when tactile feedback is given and user finger touches 2 the tactile audio display 20.

Embodiment 4

In this example, the tactile audio display 20 has at least two actuators 50.

The apparatus 10 adaptively selects the actuator 50 closest to a location of a touch 2, to give tactile (haptic) feedback whereas all (or most of the other) actuators 50 are used to produce an output acoustic audio signal.

In some cases, the user may slide his finger on the tactile audio display 20 so that it is first closer to a first actuator 50 and then to a second actuator 50. The apparatus 10 can change the actuator 50 that gives haptic feedback from the first to the second actuator 50. The change may have some hysteresis so that the apparatus 10 switches to the second actuator 50 only if the finger touch 2 moves somewhat closer to it than the first actuator 50. Typically, the switch would occur only if the finger touch distance to the second actuator 50 is half of the finger touch distance to the first actuator 50. This may require synchronizing the input audio signal 42 and the tactile feedback signal 44 based on the finger touch location. If the change occurs rather exactly when the finger is halfway between the two actuators 50, then the input audio signal 42 and the tactile feedback signal 44 are in sync at that point. However, at other points the second actuator signal is synchronized so that it arrives in sync with the first actuator signal to the finger position.

In the foregoing examples, the modifications done to the tactile feedback signal 44 and the input audio signal 42 can be various: filtering, equalization, compression etc. Additionally, the changes can take into account the importance of the signals or parts of the signals. The importance detection can use known methods from prior arts like recognizing speech as an important signal, recognizing important parts of the audio or haptic signals using metadata etc. The apparatus 10 then gives room (frequency range) to the important parts for example so that if there are important parts in the audio, then the input audio signal 42 is not high-pass filtered but the tactile feedback signal 44 is low-pass filtered.

This brings contextuality to the modifications so that contextually important parts (in input audio signals 42 and/or tactile feedback signals 44) are retained, and not so important parts tactile (in input audio signals 42 and/or tactile feedback signals 44) can be attenuated/removed.

Where a structural feature has been described, it may be replaced by means for performing one or more of the functions of the structural feature whether that function or those functions are explicitly or implicitly described.

The above-described examples find application as enabling components of: automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one." or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

The invention claimed is:

1. An apparatus comprising:
    at least one processor; and
    at least one memory storing instructions that, when executed by the at least one processor, cause the apparatus at least to:
        determine if there is a touch at a tactile audio display comprising actuators configured to produce tactile feedback via touch at the tactile audio display in dependence on an input tactile feedback signal and to produce an acoustic audio signal from the tactile audio display in dependence on an input audio signal;
        if there is a determined touch, perform a first differential signal processing on the input tactile feedback signal and the input audio signal, before provision to the actuators of the tactile audio display, to cause a relative attenuation between a lower frequency range and a higher frequency range for the input audio signal compared to the input tactile feedback signal;
        determine at least a location on the tactile audio display that has been touched and configured to cause a relative attenuation between a lower frequency range and a higher frequency range for the input audio signal compared to the input tactile feedback signal selectively for a first set of one or more actuators adjacent the determined location; and
        apply attenuation at lower-frequencies to the input audio signal for the first set of one or more actuators adjacent the determined location and configured to apply amplification at lower-frequencies to the input audio signal for a second set the one or more actuators not adjacent the determined location.

2. An apparatus as claimed in claim 1, wherein the amplification at lower-frequencies to the input audio signal for the second set of one or more actuators not adjacent the determined location is controlled to compensate for the attenuation at lower-frequencies to the input audio signal for the first set one or more actuators adjacent the determined location.

3. An apparatus as claimed in claim 1, further caused to use the first set of one or more actuators adjacent the determined location for tactile feedback, not for producing an acoustic audio signal or caused to use actuators other than the first set of one or more actuators adjacent the touch location for audio.

4. An apparatus as claimed in claim 1, further caused to adaptively select, based on the determined location, one or more actuators for tactile feedback and one or more actuators for audio output, wherein as the determined location changes, the one or more actuators selected for tactile feedback changes.

5. An apparatus as claimed in claim 4, wherein the actuator selected for the tactile feedback is a first actuator when the determined location is closer the first actuator compared to a second actuator and wherein the actuator selected for the tactile feedback changes from the first actuator to the second actuator only when the determined location passes a transition point that is closer to the second actuator than the first actuator by more than a threshold value.

6. An apparatus as claimed in claim 5, further caused to time shift the input tactile feedback signal provided to the second actuator relative to that provided to the first actuator in dependence upon the threshold value.

7. An apparatus as claimed in claim 1, wherein the first differential signal processing is adapted in dependence on at least one of a pressure or location of a touch on the tactile audio display, wherein processing of the input audio signal is adapted in dependence on at least one of the pressure or the location of the touch on the tactile audio display.

8. An apparatus as claimed in claim 7, wherein the processing of the input audio signal comprises at least one of:
    a level of the input audio signal is increased with increasing pressure;
    a level of the input audio signal is increased with decreasing distance between the location of the touch and an actuator that receives the input audio signal;
    a relative attenuation of lower frequencies compared to higher frequencies for the input audio signal increases with increasing pressure; or
    a relative attenuation of lower frequencies compared to higher frequencies for the input audio signal increases with decreasing distance between the location of the touch and an actuator that receives the input audio signal.

9. An apparatus as claimed in claim 1, wherein the first differential signal processing on the input tactile feedback signal and the input audio signal, before provision to the actuators of the tactile audio display, is configured to cause a relative attenuation of higher frequencies compared to lower frequencies for the input tactile feedback signal.

10. An apparatus as claimed in claim 9, wherein the higher frequency range and the lower frequency range are separated by a cut-off frequency that changes in dependence upon a pressure and/or a location of a touch on the tactile audio display.

11. An apparatus as claimed in claim 1, wherein the first differential signal processing is based on importance detection, and avoids attenuation of important parts of important signals.

12. A method comprising:
    determining if there is a touch at a tactile audio display comprising actuators configured to produce tactile feedback via touch at the tactile audio display in dependence on an input tactile feedback signal and to produce an acoustic audio signal from the tactile audio display in dependence on an input audio signal;
    if there is a determined touch, performing a first differential signal processing on the input tactile feedback signal and the input audio signal, before provision to the actuators of the tactile audio display, to cause a relative attenuation between a lower frequency range and a higher frequency range for the input audio signal compared to the input tactile feedback signal;
    determining at least a location on the tactile audio display that has been touched and causing a relative attenuation between a lower frequency range and a higher frequency range for the input audio signal compared to the input tactile feedback signal selectively for a first set of one or more actuators adjacent the determined location; and applying attenuation at lower-frequencies to the input audio signal for the first set of one or more actuators adjacent the determined location and configured to apply amplification at lower-frequencies to the input audio signal for a second set the one or more actuators not adjacent the determined location.

13. A method as claimed in claim 12, wherein the amplification at lower-frequencies to the input audio signal for the second set of one or more actuators not adjacent the determined location is controlled to compensate for the attenuation at lower-frequencies to the input audio signal for the first set one or more actuators adjacent the determined location.

14. A method as claimed in claim 12, further comprising using the first set of one or more actuators adjacent the determined location for tactile feedback, not for producing an acoustic audio signal or configured to use actuators other than the first set of one or more actuators adjacent the touch location for audio.

15. A method as claimed in claim 12, further comprising adaptively selecting, based on the determined location, one or more actuators for tactile feedback and one or more actuators for audio output, wherein as the determined location changes, the one or more actuators selected for tactile feedback changes.

16. A non-transitory computer readable medium comprising program instructions stored thereon for performing at least the following:

determining if there is a touch at a tactile audio display comprising actuators configured to produce tactile feedback via touch at the tactile audio display in dependence on an input tactile feedback signal and to produce an acoustic audio signal from the tactile audio display in dependence on an input audio signal;

if there is a determined touch, performing a first differential signal processing on the input tactile feedback signal and the input audio signal, before provision to the actuators of the tactile audio display, to cause a relative attenuation between a lower frequency range and a higher frequency range for the input audio signal compared to the input tactile feedback signal;

determining at least a location on the tactile audio display that has been touched and causing a relative attenuation between a lower frequency range and a higher frequency range for the input audio signal compared to the input tactile feedback signal selectively for a first set of one or more actuators adjacent the determined location; and applying attenuation at lower-frequencies to the input audio signal for the first set of one or more actuators adjacent the determined location and configured to apply amplification at lower-frequencies to the input audio signal for a second set the one or more actuators not adjacent the determined location.

\* \* \* \* \*